June 2, 1931.  P. A. GOLLNICK ET AL  1,807,840
CUTTING MECHANISM FOR SHEETS
Filed Aug. 1, 1927  4 Sheets-Sheet 1
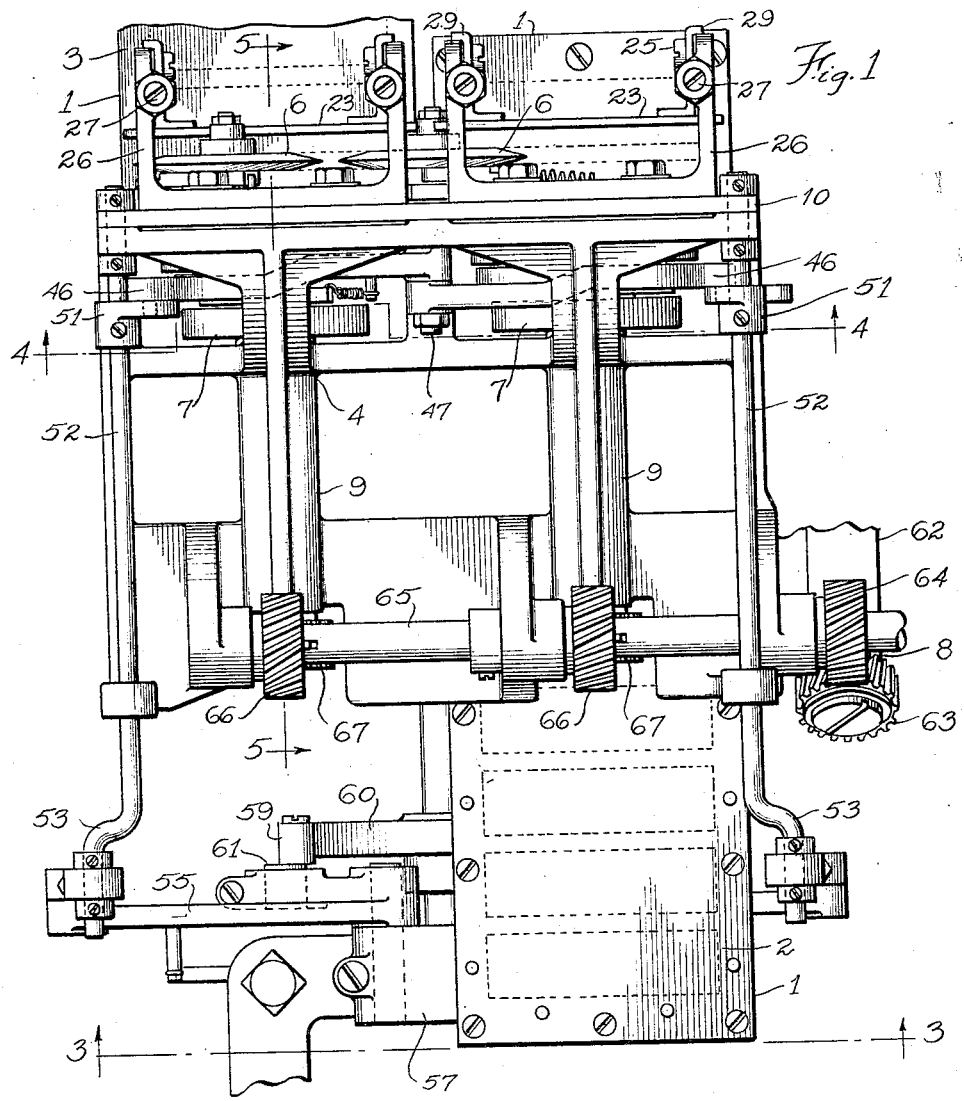
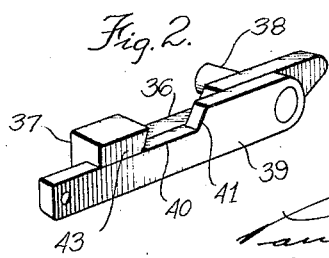

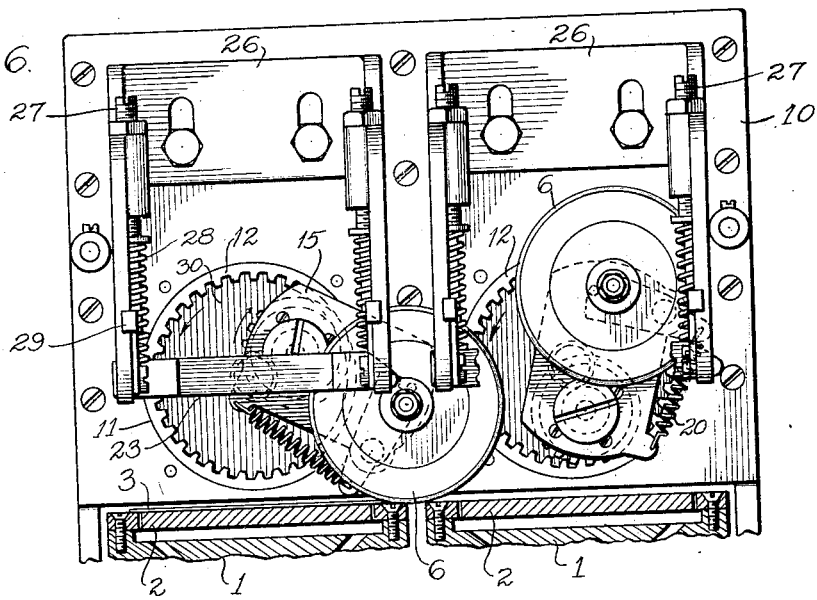
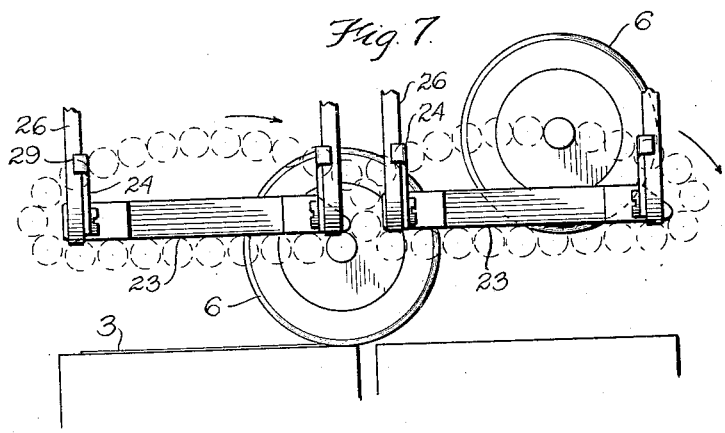
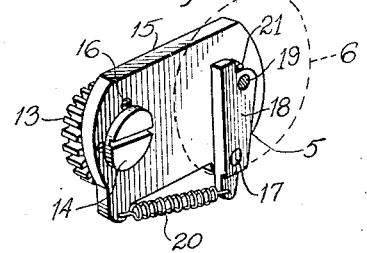

Patented June 2, 1931

1,807,840

UNITED STATES PATENT OFFICE

PAUL A. GOLLNICK AND JOHN J. TOOLAN, OF CHICAGO, ILLINOIS, ASSIGNORS, BY MESNE ASSIGNMENTS, TO SELECTOGRAPH COMPANY, OF CHICAGO, ILLINOIS, A CORPORATION OF ILLINOIS

CUTTING MECHANISM FOR SHEETS

Application filed August 1, 1927. Serial No. 209,903.

The main objects of this invention are to provide an improved mechanism for cutting sheet material; to provide improved mechanism for operating and guiding a rotary knife; to provide a sheet cutting mechanism having an improved form of knife; to provide an improved form and arrangement of mounting for the knife; to provide improved operating mechanism adapted to intermittently actuate said mounting to cause the knife to move in a cyclic path across the sheet; to provide improved means for steadying the knife during its travel across the sheet; and to provide a cutting mechanism of this kind which is particularly adapted for use in connection with stencil making machines for cutting the tissue sheets into strips which are applied to the usual cardboard frames.

An illustrative embodiment of this invention is shown in the accompanying drawings, wherein:—

Fig. 1 is a fragmentary plan of a stencil making machine to which an improved cutting mechanism is applied.

Fig. 2 is an enlarged detail in perspective of the detent and latch forming part of the clutch which controls the rotation of the knife.

Fig. 6 is a vertical section, partly broken away, taken on the line 6—6 of Fig. 5.

Fig. 7 is a detail in elevation showing the two knives and part of the means for steadying them; the dotted outlines representing the paths followed by the axes of the knives.

Fig. 8 is an enlarged detail of the mounting of one of the knives; the knife being shown in dotted outline.

Figure 3:
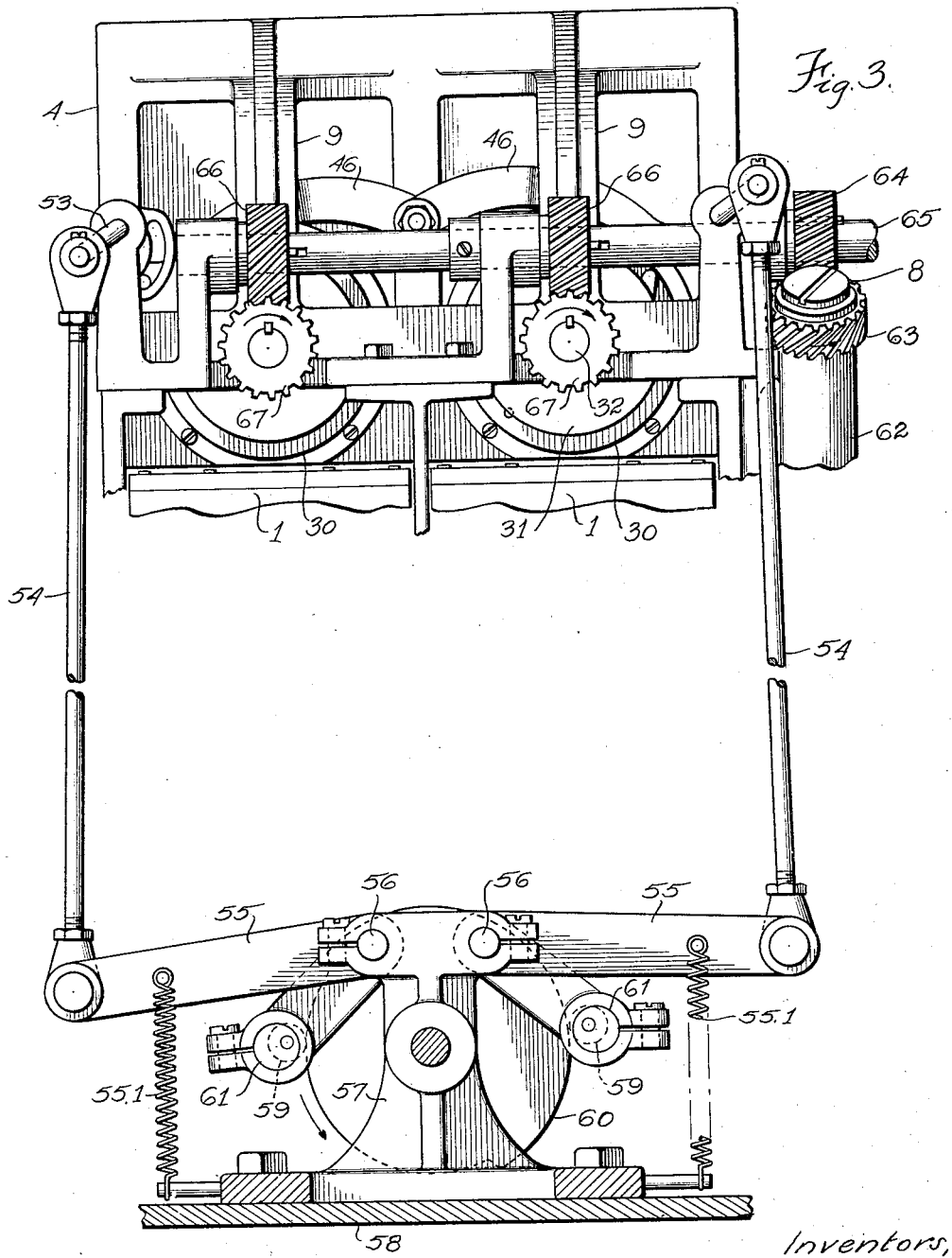
Fig. 3 is a vertical section partly broken away and taken on the line 3—3 of Fig. 1.
Figure 4:
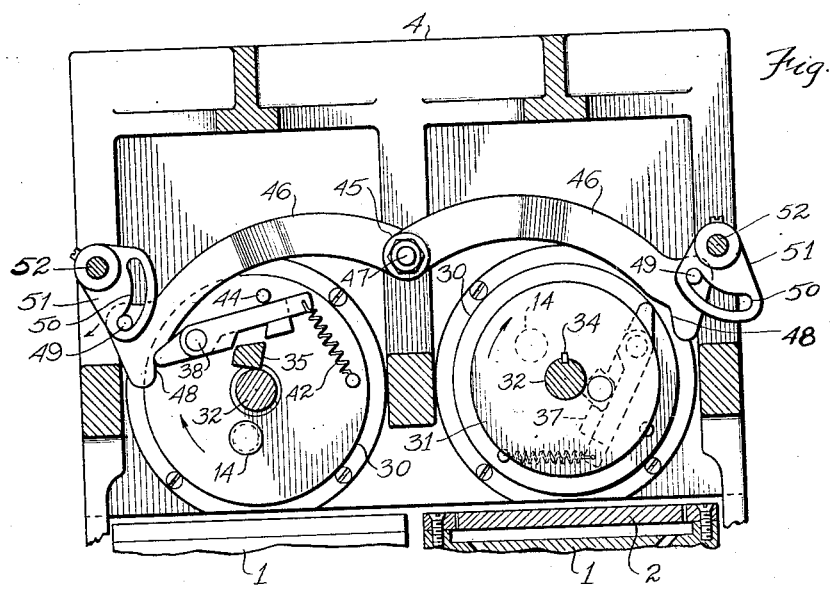
Fig. 4 is a transverse section, taken on the line 4—4 of Fig. 1.
Figure 5:
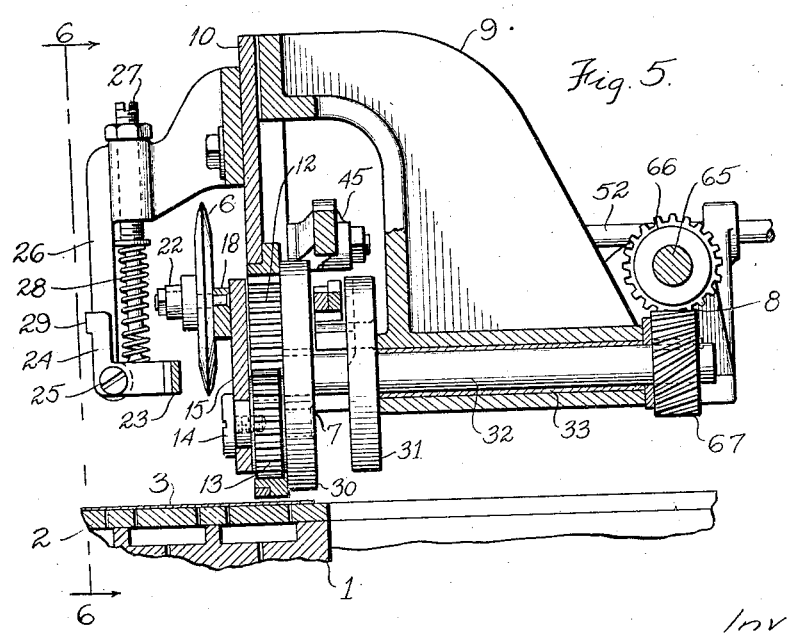
Fig. 5 is a transverse section, taken on the line 5—5 of Fig. 1.

The improved sheet cutting mechanism to which this invention is applied is adapted for use in many different types of machines, but, as herein illustrated, the invention is applied to a stencil making machine for cutting the tissue sheets into patches. Inasmuch as this invention relates to the sheet cutting mechanism, certain parts of the machine not relating thereto and believed to be unnecessary to a complete understanding of the invention have been omitted from the drawings.

In the embodiment shown, the improved cutting mechanism is applied to a stencil making machine including a pair of horizontal tables 1, having foramenous supporting surfaces 2, adapted to support sheets 3, which are acted upon by a pneumatic mechanism, not shown, associated with the tables and fully described in the copending application of Paul A. Gollnick, John J. Toolan and Benjamin L. Lurie, Serial No. 140,180, filed October 7, 1926. The tables 1 move edgewise step-by-step in one direction for feeding the sheets 3 edgewise to the improved cutting mechanism, which cuts each sheet into units or patches of proper size for use in making stencils of the type employed in addressing machines.

In the machine herein shown, two tables 2 are employed in order that there be no interruption in the stencil making operations. The movements of the tables are properly timed so that, when one table reaches the limit of its forward movement, the second table will have started forward with another sheet to be cut into strips. The operation of these tables is fully disclosed in said copending application.

In order that there be no interruption in the cutting operation, many of the parts of the cutting mechanism have been duplicated for operation in connection with both tables.

In the specific form herein shown the improved cutting mechanism comprises a frame 4, having supported thereon a pair of mountings 5, supporting rotary knives 6, and adapted to be intermittently driven through predetermined cyclic paths by a pair of clutches 7 which are actuated by an operating mechanism 8.

The frame 4 includes a pair of brackets 9, to which is secured an upright plate 10. Formed in the plate 10, is a pair of openings 11, in which is supported a pair of stationary internal gears or racks 12. Meshing with the internal gears 12, are pinions 13, loosely mounted on studs 14, which are fixed on the driven members of the clutches 7, so as to be thereby driven around the internal gears 12 for rotating the mountings 5 and simultaneously moving them through cyclic paths.

In the form shown, each of the mountings 5 includes a plate 15 loosely mounted on the stud 14 and secured to the respective pinions 13 by screws 16 or other suitable fastening means. Pivotally secured to each plate 15, by means of a pin 17, is an arm 18 having a pin 19 on which the respective rotary knife 6 is journaled. The outer end of the arm 18 extends beyond the pivot 17 for attachment to a spring 20, which is secured to the plate 15 for normally urging the inner end of the arm 18 into engagement with a stop pin 21 mounted on the plate 15. With this improved arrangement of parts, the knife 6 is adapted to yield when in contact with the supporting surface 2 of the respective table 1, so as to prevent injury to the cutting edge of the knife.

Each of the knives is driven by its respective mounting through a cyclic path, as illustrated in Fig. 7. The dotted outlines in this figure represent various positions of the axis of each knife. As shown in Figs. 6 and 7, when each of the mountings 5 travels in one direction, the respective knife is held in rolling contact with the supporting surface 2 and when the mounting moves in the opposite direction, the knife is lifted clear of the supporting surface so as to permit the table 1 to advance one step for placing the sheet 3 in position for the next cut.

Mounted on the pins 19 are rollers 22 adapted to engage the lower edges of guide rails 23 for steadying the knives during the cutting operation. The guide rails 23 are supported by bell cranks 24 pivoted at 25 to brackets 26 which are rigidly secured to the front plate 10 of the frame 4. Supported in the brackets 26, are vertically adjustable pins 27, having helical springs 28 arranged to resiliently urge the guide rails 23 downwardly. The downward movement of the rails 23 is limited by shoulders 29 formed on the bell cranks 24 in position to engage the brackets 26.

The movement of the knives 6 is timed so that, at the end of each step in the advancing movement of the tables 1, the respective knife 6 is driven across the table to sever a strip from the sheet 3.

In the form shown, the clutches 7 include driven members or disks 30 and driving members or disks 31 supported on a pair of substantially parallel shafts 32 journaled in bushings 33 in the brackets 9 and arranged to be continuously driven by the operating mechanism 8. The disks 30 are loose on the shafts 32 and the disks 31 are keyed thereto by keys 34.

Mounted on the inner face of each of the disks 31, is a pin 35 adapted to engage a recess 36 in a detent 37 pivotally mounted on the adjacent disk 30 by means of a pin 38. The recess 36 is considerably wider than the pin 35 so as to permit the pin to readily engage the recess while the disk 31 rotates. Also pivoted on the pin 38, is a latch 39 having a recess 40 adapted to receive the pin 35 and a shoulder 41 arranged to engage said pin to secure the clutch members against back-lash. The latch 39 is resiliently urged into position to engage the pin 35 by a spring 42 which acts between the outer end of the latch 39 and the disk 30. The outer end of the latch 39 engages a shoulder 43 on the detent 37 so as to urge the detent into position to engage the pin 35.

Movement of the detents 37 and latches 39 away from the pins 35 is limited by stop pins 44 mounted on the disks 30. The outer ends of the detents 37 are arranged so as to be adapted to engage a retracting mechanism 45 which normally holds the detents out of engagement with the pins 35 but which intermittently releases the detents to permit operation of the clutches.

In the embodiment illustrated, the retracting mechanism 45 comprises a pair of arcuate arms 46 pivoted to each other and to the frame 4 by a pin 47. Formed in the arms 46 adjacent their outer ends, are notches 48 adapted to receive the outer ends of the detents 37. Fixed on the outer ends of the arms 46, are pins 49 which engage cam grooves 50 in rocker cams 51 whereby the arms 46 are intermittently and alternately oscillated for releasing the detents 37.

The cams 51 are fixed on rocker shafts 52 journaled in the frame 4. Formed on the shafts 52, are cranks 53 engaging links 54 which are pivoted to bell crank levers 55. The bell crank levers 55 are pivoted at 56 to a supporting bracket 57 mounted on a base 58.

Supported in the bell cranks 55, are rollers 59, which engage a rotary cam 60 for intermittently and alternately actuating the bell cranks 55 to actuate the arms 46. The rollers 59 are eccentrically mounted on hubs 61 to permit adjustment of the rollers relative to the cam 60. The rollers 59 are resiliently held in contact with the cam 60 by means of springs 55.1, which act between the bell cranks 55 and the base of the bracket 57. The cam 60 is rotatably mounted in the bracket 57 and may be connected with the operating mechanism 8 or driven in any other suitable manner.

The operating mechanism 8 includes a continuously driven shaft 62 having a worm gear 63 meshing with a worm 64 fixed on a shaft 65 which is journaled in the frame 4. Keyed to the shaft 65, are worm gears 66 meshing with worm gears 67 fixed on the clutch shafts 32 whereby the clutch disks 31 may be driven continuously.

In operation, a sheet of tissue is placed on the table 1 when it occupies its initial position of rest at the front side of the machine. While the sheet is held on the table by suction, the table moves forwardly step-by-step to feed the sheet edgewise to the knife. During each brief period of rest of the table, the respective clutch 7 operates to actuate its knife 6, which thereby rolls in contact with the sheet 3 for severing a strip therefrom. The intermittent operation of one knife is continued until the adjacent table 1 completes its advancing movement. The second table 1 then begins to feed its sheet to the second knife and, while the second knife operates intermittently, the first knife remains idle.

Although but one specific embodiment of this invention has been herein shown and described, it will be understood that numerous details of the construction shown may be altered or omitted without departing from the spirit of this invention, as defined by the following claims.

We claim:

1. The combination with a support, of a rotatable mounting, and a rotatable knife carried by said mounting and thereby movable across the support, the axes of rotation of said mounting and knife being substantially parallel with said support, said knife moving in a plane substantially normal to said support, the axis of said knife being movable toward and from the axis of said mounting whereby said knife is adapted to yield when in contact with the support.

2. The combination with a support for sheets, of a mounting movable through a cyclic path transverse to said support, mechanism for intermittently actuating said mounting, an arm hinged on said mounting, and a knife rotatably supported on said arm, said mounting being arranged to hold said knife in rolling contact with the support when moving in one direction and to lift it clear of the support when moving in the opposite direction.

3. The combination with a support, of a mounting movable through a cyclic path transverse to said support, a knife supported on said mounting and adapted to move in contact with the support during a portion of the movement of said mounting, a gear on said mounting, an annular rack engaging said gear, operating mechanism for moving said gear in engagement with said rack, and a clutch arranged to intermittently connect said gear with said operating mechanism.

4. The combination with a support, of a gear, a pinion meshing with said gear, a mounting supported on said pinion and movable thereby through a cyclic path transverse to said support, a knife supported on said mounting and thereby movable in contact with the support, operating mechanism, and a clutch arranged to intermittently connect said pinion with said operating mechanism.

5. The combination with a support, of an internal gear, a pinion meshing with said gear, a mounting supported on said pinion and thereby movable through a cyclic path transverse to said support, a rotary knife supported on said mounting, said mounting being adapted to hold said knife in rolling contact with the support when moving in one direction and to lift it clear of the support when moving in the opposite direction, and operating mechanism for intermittently actuating said pinion.

6. The combination with a support, of an internal gear, a pinion meshing with said gear, a mounting supported on said pinion and thereby movable through a cyclic path transverse to said support, a rotary knife supported on said mounting, said mounting being adapted to hold said knife in rolling contact with the support when moving in one direction and to lift it clear of the support when moving in the opposite direction, the axis of said knife being movable relative to said mounting whereby said knife is adapted to yield when in contact with the support, operating mechanism, and a clutch for intermittently connecting said pinion with said actuating mechanism.

7. The combination with a support for sheets, of a mounting movable through a cyclic path transverse to said support, an arm hinged on said mounting, a knife rotatably supported on said arm, and a spring yieldingly urging said arm into position to hold said knife in rolling contact with the support when said mounting moves in one direction, said mounting being arranged to lift said knife clear of the support when moving in the opposite direction.

8. The combination with a support, of a stationary annular rack located on one side of the support, a rotatable member, a mounting rotatably supported on said member, a gear fixed on said mounting and engaging said rack for moving said mounting through a cyclic path during the rotation of said member, and a knife rotatably supported on said mounting and movable thereby in rolling contact with the support.

9. The combination with a support, of a stationary annular rack located on one side of the support, a rotatable member, a mounting rotatably supported on said member, a gear fixed on said mounting and engaging said rack for moving said mounting through a cyclic path during the rotation of said member, an arm hinged on said mounting, and a knife rotatably mounted on said arm and movable in rolling contact with the support.

10. The combination with a support, of a stationary annular rack located on one side of the support, a rotatable member, a mounting rotatably supported on said member, a gear fixed on said mounting and engaging said rack for moving said mounting through a cyclic path during the rotation of said member, and a knife rotatably supported on said mounting and movable thereby in rolling contact with the support during the engagement of said gear with a certain portion of said rack, said knife being retracted out of contact with the support during the engagement of said gear with the remaining portion of said annular rack.

11. The combination with a support, of a stationary annular rack located on one side of the support, a rotatable member, a mounting rotatably supported on said member, a gear fixed on said mounting and engaging said rack for moving said mounting through a cyclic path during the rotation of said member, an arm movably supported on said mounting, a knife rotatably supported on said arm, and a spring yieldingly urging said arm into position to hold said knife in rolling contact with the support when said gear engages a certain portion of said rack, said knife being retracted from the support during the engagement of said gear with the remaining portion of said rack.

12. The combination with a support, of a stationary annular rack located on one side of the support, a rotatable member, a mounting rotatably supported on said member, a gear fixed on said mounting and engaging said rack for moving said mounting through a cyclic path during the rotation of said member, a knife rotatably supported on said mounting and movable thereby across said support, and a guide rail yieldingly urging said knife into contact with said support during the engagement of said gear with a certain portion of said rack, said knife being retracted out of contact with said support during the engagement of said gear with the remainder of said rack.

Signed at Chicago this 28th day of July, 1927.

PAUL A. GOLLNICK.
JOHN J. TOOLAN.